United States Patent Office 3,533,843
Patented Oct. 13, 1970

3,533,843
ZINC ELECTRODE AND METHOD OF FORMING
Elihu C. Jerabek, Voorheesville, and Robert P. Hamlen, Scotia, N.Y., assignors to General Electric Company, a corporation of New York
No Drawing. Filed Nov. 25, 1968, Ser. No. 778,829
Int. Cl. H01m 43/02
U.S. Cl. 136—30
4 Claims

ABSTRACT OF THE DISCLOSURE

A zinc electrode is disclosed which comprises a support, and a mixture of amalgamated zinc powder and metallic or alkyl substituted ammonium hydroxide particles on opposite surfaces of the support. A method of forming a zinc electrode comprises mixing together amalgamated zinc powder and metallic or alkyl substituted ammonium hydroxide particles, applying the mixture to opposite surfaces of a support, and pressing the mixture against the support.

---

This invention relates to zinc electrodes and to methods of forming such electrodes and, more particularly, to such electrodes with extended shelf life and to methods of forming such electrodes.

Zinc electrodes are useful as anodes in a variety of primary cells and batteries. Such cells and batteries employ generally an aqueous alkaline electrolyte, such as potassium hydroxide or sodium hydroxide. A suitable cathode is a depolarizing electrode which is active in an alkaline electrolyte, such as silver oxide.

Presently, serious problems in such cells include loss of capacity of the zinc electrode on open circuit, and shortened shelf-life. Our invention is directed to an improved zinc electrode and method of forming such an electrode wherein these problems are eliminated.

It is a primary object of our invention to provide a zinc electrode which is not subject to loss of capacity, caused by self-discharge prior to cell or battery operation, or to a shortened shelf-life.

It is another object of our invention to provide an improved method of forming such an electrode.

In accordance with our invention, a method of forming a zinc electrode comprises mixing together amalgamated zinc powder and particles selected from the class consisting of metallic hydroxides and substituted ammonium hydroxides, applying the mixture to opposite surfaces of a support, and pressing the mixture against the support thereby forming a zinc electrode.

These and various other objects, features and advantages of the invention will be better understood from the following description.

A pressed zinc electrode is prepared in accordance with our invention by providing zinc powder which has been amalgamated by mercury, for example, by mixing zinc powder in a mercury salt electrolyte such that the zinc powder becomes amalgamated to about 5 weight percent mercury. A support is used onto which the above mixture is applied to opposite sides thereof and pressed thereby forming an electrode.

We discovered unexpectedly that a zinc electrode can be formed which will not be subject to a loss of capacity prior to cell or battery operation in which it is utilized as the anode, and will exhibit a long shelf-life. We found that we could prepare such an electrode with an electrolyte selected from the class consisting of metallic hydroxides and substituted ammonium hydroxides in dry or non-activated state contained within the zinc electrode. With this unique structure, the electrode is assembled into a cell which is activated prior to operation by merely adding water to the cell and sealing the cell. Without an aqueous electrolyte in the cell prior to operation, there is no loss in capacity from self-discharge on open circuit. The shelf-life of the electrode and the cell in which it is incorporated is much longer than such a cell employing an aqueous electrolyte at the time of manufacture.

We found that the particles of the hydroxide should be larger than the particles of zinc so that zinc particle contact is maintained in the electrode. We found further that it was preferable to use 10 to 40 weight percent of hydroxide in the electrode thereby providing porosity in the electrode but maintaining high utilization of the zinc.

Our electrode has a support which is usually in the form of a metallic screen, and preferably in the form of a silver screen. In the assembly of the electrode, an electrical lead is attached to the support. Zinc powder is amalgamated by mercury, for example, by mixing zinc powder in a mercury salt electrolyte such that the zinc becomes amalgamated to about 5 weight percent mercury. A dry metallic hydroxide of a dry substituted ammonium hydroxide is crushed to form smaller size particles. The amalgamated zinc powder and hydroxide particles are mixed together.

While various metallic hydroxides can be utilized in the practice of our invention, we prefer to employ sodium hydroxide or potassium hydroxide. While various substituted ammonium hydroxides can also be employed in our invention, we prefer the substituted ammonium to be a tetra-substitution of an alkyl radical with one to four carbon atoms. Of these substituted alkyl radicals, we prefer further to employ tetramethyl or tetraethyl substitutions. It will, of course, be appreciated that more than one alkyl radical can be substituted in the tetra-substituted ammonium hydroxide.

A die is filled with the above mixture after which the screen support with its lead is positioned in the center of the mixture. In this manner, the powder mixture is applied to opposite surfaces of the support. The mixture is pressed against the support at a pressure of generally about 5,000 pounds per square inch to form our zinc electrode structure.

The above type of zinc electrode containing, for example, sodium hydroxide is then employed in a primary cell or battery which has a cathode electrode, such as silver oxide, and at least one chemically inert, porous separator, such as a membrane barrier separator of cellophane between the electrode. This cell has a long shelf-life, and since no aqueous electrolyte is present, there is no loss of capacity caused by conventional self-discharge. The cell is readily activated by adding water to the cell and sealing the cell. Upon the addition of water, an aqueous electrolyte is formed from the dry state metallic hydroxide in the zinc electrode. The cell is discharged by applying a load across the electrodes.

Examples of a zinc electrode, a method of forming such an electrode and a cell employing such an electrode in accordance with our invention are set forth below:

EXAMPLE 1

A zinc electrode was prepared by mixing zinc powder in a mercury salt electrolyte of mercuric chloride so that the zinc powder became amalgamated to 5 weight percent mercury. Ten grams of this amalgamated zinc powder and two grams of crushed sodium hydroxide were mixed together. A support in the form of a silver screen was used. A die was filled with the above mixture after which the screen support with an electrical lead extending therefrom was positioned in the center of the powder. In this manner, the powder mixture was applied to opposite surfaces of the support. The powder was pressed against the support at a pressure of 5,000 pounds per square inch to thereby form a zinc electrode.

EXAMPLE 2

The zinc electrode of Example 1 was positioned as the anode in an electrically insulated cell casing. This electrode was 7.86 ampere hours in capacity. A pressed silver oxide electrode, which was 10 ampere hours in capacity was positioned in the cell as the cathode. The electrodes were separated by a cellophane membrane separator. No loss in capacity due to self-discharge results since no aqueous electrolyte is present.

Subsequently, distilled water was added in the amount of 3.6 cc. to make an aqueous electrolyte of 35.7 weight percent sodium hydroxide. The cell was operated through 148 ohms load for 670 hours giving 6 ampere hours capacity. The cell was operated then through 682 ohms load providing an additional 0.5 ampere hour capacity.

While other modifications of the invention and variations thereof which may be employed within the scope of the invention have not been described, the invention is intended to include such as may be embraced within the following claims.

What we claim as new and desire to secure by Letters Patent of the United States is:

1. A method of forming a dry zinc electrode which comprises mixing together amalgamated zinc powder and particles of an alkyl substituted ammonium hydroxide, applying the mixture to opposite surfaces of a support, and pressing the mixture against the support thereby forming a bonded zinc electrode.

2. A method as in claim 1, wherein the alkyl substituted ammonium hydroxide is selected from the group consisting of tetramethyl ammonium hydroxide and tetraethel ammonium hydroxide.

3. A dry zinc electrode comprising a support, and a powder mixture of amalgamated zinc and an alkyl substituted ammonium hydroxide bonded to the support.

4. A zinc electrode as in claim 3, wherein the alkyl substituted ammonium hydroxide is selected from the group consisting of tetramethyl ammonium hydroxide and tetraethyl ammonium hydroxide.

References Cited

UNITED STATES PATENTS

| | | | |
|---|---|---|---|
| 2,865,974 | 12/1958 | Scheurele et al. | 136—30 |
| 3,071,638 | 1/1963 | Clark et al. | 136—31 |
| 3,226,260 | 12/1965 | Drengler | 136—30 |
| 3,236,696 | 2/1966 | Andre | 136—31 |
| 3,418,171 | 12/1968 | Popat | 136—100 |
| 3,427,203 | 2/1969 | Fletcher | 136—125 |

WINSTON A. DOUGLAS, Primary Examiner

C. F. LEFEVOUR, Assistant Examiner

U.S. Cl. X.R.

136—125